Aug. 11, 1964    R. A. LE MASSENA    3,144,295
MEASURING APPARATUS
Original Filed Aug. 30, 1957
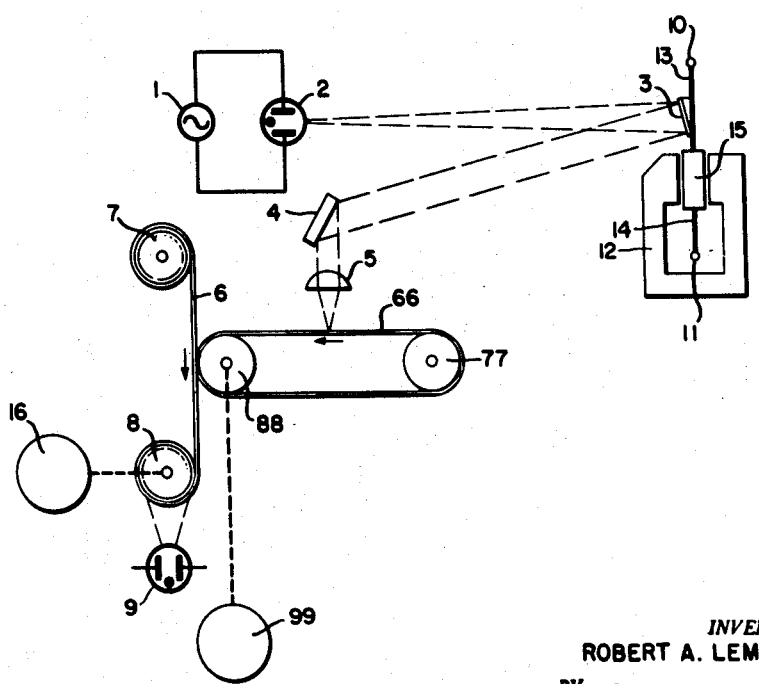
INVENTOR.
ROBERT A. LEMASSENA
BY
ATTORNEY.

United States Patent Office 3,144,295
Patented Aug. 11, 1964

3,144,295
MEASURING APPARATUS
Robert A. Le Massena, Denver, Colo., assignor to Minneapolis-Honeywell Regulator Company, Minneapolis, Minn., a corporation of Delaware
Original application Aug. 30, 1957, Ser. No. 681,337, now Patent No. 3,107,138, dated Oct. 15, 1963. Divided and this application Nov. 21, 1962, Ser. No. 247,779
10 Claims. (Cl. 346—109)

This application is a divisional application of a copending application by Robert A. Le Massena, Serial No. 681,337; filed on August 30, 1957, now Patent Number 3,107,138, issued October 15, 1963. Subject matter disclosed but not claimed in this application is shown and claimed in the aforesaid copending application of Robert A. Le Massena.

This invention relates to oscillographic recorders which provide means for recording the variations with time of any physical, mechanical, electrical, chemical, or other phenomena which can be converted to an electric current. Such oscillographic recorders are well known.

It is an object of this invention to provide a recording oscillograph which produces a record which becomes visible immediately as it is being made and which is permanent.

Such oscillograph recorders are disclosed in U.S. Patent 2,580,427 to C. A. Heiland and in application for U.S. patent Serial No. 638,729 by John P. Mahoney and R. S. Kampf.

This patent and this application disclose a recording medium which includes a silver halide. Such a recording medium is sold by the Eastman Kodak Company under their trademarks "Kodak #1090" and "Kodagraph Positive."

Another recording medium includes phosphorescent material, such as zinc silicate, zinc phosphate or zinc sulphide.

Another recording medium includes a fluorescent material, such as fluorescein, or many other, known organic compounds.

Another recording medium includes a heat-sensitive material, such as that sold under the trademark "Permapaper" which comprises a dark base covered by an opaque light coating which melts, when heated, to provide a visible trace. Alternatively, the heat-sensitive material may comprise a porous coating having carbon therein which diffuses through the coating upon the application of heat thereto.

It is an object of this invention to provide a recording oscillograph in which the recording medium includes a silver halide in combination with one or more of the fluorescent, phosphorescent and/or heat-sensitive materials mentioned above. By this means, a record is obtained which becomes immediately visible due to the action of the fluorescent, the phosphorescent, and/or the heat-sensitive material and which record remains permanently visible due to the action of the silver halide.

A better understanding of the present invention may be had from the following detailed description when read in connection with the accompanying drawings, in which:

The single figure of the drawing is a diagrammatic showing of the oscillographic recorder of this invention and of the beam of radiation which it employs.

Reference is here made to U.S. Patent 2,580,427 and to application for U.S. patent Serial No. 638,729 for a disclosure of the details of representative oscillographic recorders in connection with which this invention may be employed.

Referring to the drawings, the recording oscillograph of this invention is shown as comprising a source 1 of electricity. One suitable such source is a commercial supply of electricity of 115 volts, 60 cycles, adapted to supply at least four amperes.

A source 2 of radiant energy is connected to source of electricity 1 through a power circuit, details of which are not disclosed herein, but which are well-known.

When the recording medium contains silver halide, it is desired that the source of radiant energy emit radiation having wave lengths to which the silver halide is sensitive. For 1090 paper (mentioned above), this is from 200 millimicrons to 540 millimicrons with a maximum at 380 millimicrons in the ultra violet region. A suitable source for this purpose is a high-pressure, mercury-vapor lamp having a point-shaped arc which produces an intense, brilliant radiation. An example of such a lamp is that manufactured by Osram, Munich, Germany, and identified as their model HBO-107/1, super pressure mercury lamp. Such a lamp produces radiation over the wave length band from 200 to 1000 millimicrons, with the greatest intensity occurring roughly between 350 millimicrons and 450 millimicrons.

When the recording medium contains a heat-sensitive material, source 2 should radiate an output having wave lengths in the infra red region. Such a source is an incandescent carbon rod made by Globe-Union Company and sold under their trademark "Globar." This source produces radiation over the wave length band from 1000 to 10,000 millimicrons with a maximum at 5000 millimicrons. Another such source is a lamp having an incandescent filament.

If the recording medium contains both silver halide and heat-sensitive material, the source 2 must emit both infra red and ultra violet radiations. Mercury arcs, gas-tubes, incandescent lamps, and the new incandescent, fluorescent and mercury lamps, each emit both these wave bands.

A beam of radiant energy passes from source 2 to galvanometer mirror 3 whence it is deflected to a second mirror 4 which reflects the beam onto lens 5. Lens 5 is a segmental cylindrical lens and serves to concentrate as much as possible of the beam in a small spot of high intensity on the surface of an endless belt 66 mounted on rolls 77 and 88 and driven by a driving means or motor 99. Endless belt 66 contains a phosphorescent material. As the beam of radiant energy strikes the surface of belt 66, the spot of intense radiation causes a trace to become visible immediately. The surface of belt 66 is then contacted with recording medium 6 which contains silver halide. The visible trace on belt 66 affects a portion of the silver halide and causes a trace to appear on the recording medium 6. This trace can be made visible and permanent by the latensification treatment, if necessary.

The recording medium 6 is in the form of a sheet or film adapted to be fed in the direction shown by the arrow from a supply roll 7 to a take-up roll 8 by means of a driving means or motor 16. Such a recording medium comprises a layer of film or paper and a layer of emulsion containing silver halide, phosphorescent, fluorescent and/or heat-sensitive material.

The means for oscillating the galvanometer mirror 3 comprise a gavanometer. This galvanometer includes a means 12 for providing a magnetic field. A transducer (adapted to convert the phenomenon, whose variations it is desired to measure, into electricity) is connected to input terminals 10 and 11. To the input terminals 10 and 11 also are connected support ribbons 13 and 14 on which the galvanometer mirror 3 and the galvanometer coil 15 are supported. The support ribbons 13 and 14 may serve as electrical connections to the coil 15, or separate electrical connections (not shown) may be used for this purpose. Coil 15 is located in the magnetic field, and is connected in such a manner that the current will flow in one direction through one side of the coil and in the opposite direction through the other side of the coil which lies closely adjacent to the first. Owing to the magnetic pull between the two sides of the coil and the magnetic field, one side of the coil will be forced in a direction at right angles to its length and to the magnetic field and the other side of the coil will be forced in the opposite direction. This tends to oscillate the coil about a vertical axis against the torque supplied by a spring (not shown). This oscillation deflects the galvanometer mirror 3 and causes the beam of radiant energy to traverse along a straight line on the surface of the belt 66. But, since the recording medium is moving at uniform speed at an angle to the straight line, the spot of radiant energy formed by the beam on the recording medium causes a trace which records the variations of the phenomenon under observation.

Before the belt 66 is exposed to the beam of radiant energy from the source 2 as deflected by the galvanometer mirror 3, the silver halide recording medium may be given a pre-exposure treatment. This pre-exposure treatment comprises exposing the recording medium either to a constant, low-intensity radiant energy source of suitable spectral composition for a given time, or to a variable-intensity radiant energy source of such suitable spectral composition for a shorter time. Suitable pre-exposure times are an exposure for 14 hours to a 100 watt incandescent lamp producing radiant energy wave lengths in the band from 350 to 4000 millimicrons, peaking at about 1000 millimicrons, with the recording medium and the lamp at 9 feet from each other or an exposure of ½ hour to a 40 watt incandescent lamp with the recording medium and the lamp at 1 foot from each other.

In the second alternative, the radiant energy may be varied in intensity from zero to a specified value and increased in intensity at a rate which increases slowly at first but more rapidly thereafter. This rate of variation in intensity, when plotted against time, appears as an exponential curve. Such a suitable pre-exposure time is ½ hour to a 40 watt incandescent lamp with a distance of 1 foot between the lamp and the recording medium and the energy to the lamp varied from a minimum to a maximum.

The advantages of this pre-exposure step are:
(1) It prevents reversal of the immediately visible trace.
(2) The resultant trace is more stable.
(3) The definition or clarity of the trace is improved.

After the recording medium 6 has been contacted with the surface of belt 66 and the visible trace on belt 66 has affected a portion of the silver halide and caused a trace to appear on the surface of the recording medium 6, the recording medium 6 may be given a post-exposure or "latensification" treatment. This treatment comprises passing the recording medium, which has just been exposed to the radiant energy, close to a source of medium-intensity radiant energy. A suitable source of such medium-intensity energy is a 105–115 volt fluorescent lamp 9. A distance of from 2 to 6 inches is maintained between the lamp 9 and the recording medium 6. The time of this post-exposure treatment must be more than one-tenth of a second.

The post-exposure treatment may be accomplished in a longer time by exposure to ordinary room-intensity fluorescent illumination, or, in an even longer time, by room-intensity incandescent illumination.

For certain uses it is desirable to supplement the silver halide with a mechanical mixture of a fluorescent substance, a phosphorescent substance, and/or a heat-sensitive substance. Examples of such a phosphorescent material, of such a fluorescent material, and of such a heat-sensitive material have been given above.

An advantage of the use of a phosphorescent or of a fluorescent material is that the phosphorescent or fluorescent trace is immediately visible. An additional advantage is that this phosphorescent trace continues visible until the latent trace of the silver halide is made visible by the latensification treatment explained above. The time during which the phosphorescent trace remains visible is of the order of one to ten seconds.

An advantage of the mechanical mixture of silver halide and a heat-sensitive substance is that such a combination produces an immediately visible trace at low trace velocities and a latent trace at high trace velocities. Hence, with this recording medium, it is not necessary to pre-expose the silver halide to prevent reversal of a low velocity trace. This, in turn, permits recording of trace velocities higher than is possible with pre-exposure.

In summary, this invention includes apparatus having a beam of radiant energy which produces an immediately visible trace and a permanent trace which may be immediately visible or which may become visible upon latensification treatment.

What is claimed is:

1. An apparatus for recording the time variations of a phenomenon under observation, a source of radiant energy comprising a band of suitable wave lengths, an endless belt including a substance of substantial response to said band of wave lengths and containing means which produce an immediately visible trace upon the incidence of such radiation, a galvanometer having a coil responsive to said time variations, a mirror movable with said coil to reflect said radiations and cause them to move as a pointer with the movements of said coil and to impinge on said endless belt to produce a trace thereon, a recording medium including a substance of substantial response to said band of wave lengths and containing means which produce a latent and permanently visible trace, and means contacting said recording medium with said endless belt whereby said trace on said endless belt produces a latent and permanently visible trace on said recording medium.

2. Apparatus according to claim 1 including means for giving said recording medium a post-exposure or latensification treatment, said means comprising a source of medium-intensity radiant energy located at a short distance from said recording medium and adapted to impinge upon said recording medium for at least one tenth of a second.

3. Apparatus for recording the time-variations of a phenomenon under observation as rapidly as possible and independently of wet processing, including, a source of radiant energy comprising a band of suitable wave lengths, an endless belt including a substance of substantial response to said band of wave lengths and containing means which produce an immediately visible trace upon the incidence of such radiation thereon, means for forming at least a portion of said radiant energy into a beam and for moving it as a pointer in response to said time variations and to impinge on said endless belt to produce a trace thereon, a recording medium including a substance of substantial response to said trace and containing means which produce a latent and permanently visible trace, and means contacting said recording medium with said endless belt whereby said trace on said endless belt produces a latent and permanently visible trace on said recording medium.

4. Apparatus according to claim 3 including means for giving said recording medium a post-exposure or latensification treatment.

5. Apparatus for recording the time variations of a phenomenon under observation as rapidly as possible and independently of wet processing, including, a high-pressure mercury-vapor lamp having a point-shaped arc which produces radiant energy comprising a band of suitable wave lengths, an endless belt including a substance of substantial response to said band of wave lengths and containing means which produce an immediately visible trace upon the incidence of such radiation thereon, a galvanometer having a coil responsive to said time variations and cause them to move as a pointer with the movements of said coil and to impinge on said endless belt to produce a trace thereon, a recording medium including a substance of substantial response to said trace and containing means which produce a latent and permanently visible trace, and means contacting said recording medium with said endless belt whereby said trace on said endless belt produces a latent and permanently visible trace on said recording medium.

6. Apparatus according to claim 5 including means for giving said recording medium a post-exposure or latensification treatment, said means including, a fluorescent electric lamp located at a distance of from two to six inches from said recording medium and adapted to impinge upon said recording medium for at least one-tenth of a second.

7. In an oscillograph in which a record is made of the variations in a phenomenon under observation and of the time at which these variations occur by means of a beam of ultra-violet radiant energy comprising a band from 200 to 1000 millimicrons in wave length with the greatest intensity occurring roughly between 350 to 450 millimicrons, a recording medium including first means substantially uniform through the length and breadth of said medium and of maximum response to such wave lengths and comprising a phosphorescent material selected from the class comprising zinc silicate, zinc phosphate, and zinc sulphide and second means of maximum response to such wavelengths and comprising a silver halide and which produces a latent trace upon the incidence of such radiation thereon which trace becomes permanently visible.

8. In an oscillograph, means for simultaneously making a visible indication and a permanent record of the variations in phenomenon under observation by means of a beam of ultra-violet light comprising a band of suitable wave lengths impinging in a spot of high intensity on a recording medium and producing a trace thereon, a recording medium including a surface having first means substantially uniform throughout the length and breadth of said surface and of maximum response to such wave lengths and comprising a phosphorescent material, and second means of maximum response to such wave lengths which produces a latent trace upon incidence of such radiant energy thereon which trace becomes permanently visible.

9. In an oscillograph, means for simultaneously making a visible indication and a permanent record of the variations in phenomenon under observation by means of a beam of ultra-violet radiant energy comprising a band of suitable wave lengths impinging in a spot of high intensity on a recording medium and producing a trace thereon, a recording medium including a surface having first means substantially uniform throughout the length and breadth of said surface and of maximum response to such wave lengths and comprising a phosphorescent material, and second means of maximum response to such wave lengths and comprising a silver halide and which produces a latent trace upon the incidence of such radiant energy thereon which trace becomes permanently visible.

10. In an oscillograph, means for simultaneously producing a visible indication and a permanent record of the variations in phenomenon under observation by means of a beam of ultra-violet radiant energy impinging in a spot of high intensity on a recording medium and photographically producing a trace thereon, a recording medium including a surface having first means substantially uniform throughout the length and breadth of said surface and of maximum response to such wave lengths and comprising phosphorescent material, and second means of maximum response to such wave lengths and comprising a silver halide which produces a latent trace upon the incidence of such radiant energy thereon which trace becomes permanently visible upon the latensification of said surface by exposing it to fluorescent light.

References Cited in the file of this patent
UNITED STATES PATENTS

| | | |
|---|---|---|
| 2,482,815 | Urbach | Sept. 27, 1949 |
| 2,580,427 | Heiland | Jan. 1, 1952 |
| 2,756,343 | Johnson | July 24, 1956 |